(12) United States Patent
Takaoka

(10) Patent No.: US 9,598,803 B2
(45) Date of Patent: *Mar. 21, 2017

(54) METHOD FOR FORMING CUSHIONS

(71) Applicant: C-ENG CO., LTD., Gamagori-shi, Aichi-ken (JP)

(72) Inventor: Nobuyuki Takaoka, Gamagori (JP)

(73) Assignee: C-ENG CO., LTD., Gamagori-shi (JP)

(*) Notice: Subject to any disclaimer, the term of this patent is extended or adjusted under 35 U.S.C. 154(b) by 175 days.

This patent is subject to a terminal disclaimer.

(21) Appl. No.: 14/165,606

(22) Filed: Jan. 28, 2014

(65) Prior Publication Data
US 2014/0138016 A1    May 22, 2014

Related U.S. Application Data

(63) Continuation of application No. 13/627,147, filed on Sep. 26, 2012, now Pat. No. 8,721,825, which is a continuation-in-part of application No. PCT/JP2011/004921, filed on Sep. 1, 2011.

(30) Foreign Application Priority Data

Sep. 1, 2010  (JP) ................................. 2010-196042

(51) Int. Cl.
| | |
|---|---|
| *D04H 3/14* | (2012.01) |
| *B29D 99/00* | (2010.01) |
| *D04H 3/16* | (2006.01) |
| *B29C 43/00* | (2006.01) |
| *B29C 39/00* | (2006.01) |
| *B29L 31/58* | (2006.01) |

(52) U.S. Cl.
CPC ............ *D04H 3/14* (2013.01); *B29C 43/006* (2013.01); *B29D 99/0092* (2013.01); *B29C 39/00* (2013.01); *B29C 43/00* (2013.01); *B29L 2031/58* (2013.01); *D04H 3/16* (2013.01)

(58) Field of Classification Search
CPC ....... B29C 43/006; B29C 39/00; B29C 43/00; B29D 99/0092; B29L 2031/58; D04H 3/14; D04H 3/16
USPC ....................................................... 156/242
See application file for complete search history.

(56) References Cited

U.S. PATENT DOCUMENTS

| | | | | |
|---|---|---|---|---|
| 5,494,627 A | * | 2/1996 | Kargol .................. | B29C 43/006 264/119 |
| 5,532,050 A | * | 7/1996 | Brooks ................. | B29C 43/006 156/296 |
| 5,695,599 A | * | 12/1997 | Pankoke ................. | B27N 3/24 100/151 |
| 6,413,461 B1 | * | 7/2002 | Kobayashi ............ | B29C 43/183 264/257 |
| 6,623,676 B1 | * | 9/2003 | Davis .................. | B29B 17/0042 264/112 |

(Continued)

*Primary Examiner* — Philip Tucker
*Assistant Examiner* — Vicki Wu
(74) *Attorney, Agent, or Firm* — Matthias Scholl, PC; Matthias Scholl

(57) ABSTRACT

A method for forming cushions including the following four steps: (1) a compression step in which the structure (2) is compressed in a mold (3); (2) a thermal softening step in which the structure (2) is thermally softened by means of a heating medium; (3) a curing step in which the structure (2) directly undergoes forced cooling in a cooling medium, and is then cured; and (4) a mold release step in which the structure (2) is released from the mold (3).

4 Claims, 17 Drawing Sheets

(56) References Cited

U.S. PATENT DOCUMENTS

| | | | | |
|---|---|---|---|---|
| 8,721,825 B2* | 5/2014 | Takaoka | ............... | D04H 3/14 156/166 |
| 2001/0023510 A1* | 9/2001 | Masubuchi | ........... | B29C 44/427 5/636 |
| 2003/0092335 A1* | 5/2003 | Takaoka | ................. | B29C 43/02 442/1 |
| 2007/0001336 A1* | 1/2007 | Nishibori | ............... | A47C 27/12 264/103 |

* cited by examiner

METHOD FOR FORMING CUSHIONS

CROSS-REFERENCE TO RELATED APPLICATIONS

This application is a continuation of U.S. patent application Ser. No. 13/627,147 filed on Sep. 26, 2012, now U.S. Pat. No. 8,721,825, which is a continuation-in-part of International Patent Application No. PCT/JP2011/004921 with an international filing date of Sep. 1, 2011, designating the United States, now pending, and further claims priority benefits to Japanese Patent Application No. 2010-196042 filed Sep. 1, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tx. 77079.

BACKGROUND OF THE INVENTION

Field of the Invention

The invention relates to a method of forming a cushion and especially to a method of secondary formation of a three-dimensional netted structure having undergone a primary formation.

More specifically, the invention is directed to a method for forming a cushion having excellent impact resistance and load bearing properties, which meets the specific needs of a large number of people in various fields. Various shapes and sizes of cushions are formed by the method. The method is applicable to seat cushions used for seating, lying, or riding, including in health appliances, and vehicle seats of, e.g., automobiles, motorbikes, bicycles, trains, ships and boats and aircraft, saddles for horse-riding, chairs, sofas and beds.

Description of the Related Art

Japanese Pat. No. 4350286 describes a conventional four-face forming method for forming a three-dimensional netted structure, wherein molten filaments made of a thermoplastic resin are extruded as the material or as the main material from a die with a nozzle end having a plurality of nozzle openings so as to naturally fall between partly submerged drawing machines. The drawing speed of the filaments is set to be lower than the falling speed. Two pairs of the drawing machines, wherein the drawing machines of each pair are placed to face each other, are arranged in a quadrilateral formation in the direction perpendicular to the extruding direction. The interval between the opposed drawing machines is set to be narrower than the width of the extruded filament assembly. All four faces of the outer periphery of the filament assembly are brought into contact with the drawing machines before and after the submerged portions of the drawing machines. The density of all the four faces of the outer periphery in a direction parallel to the extruding direction is made to be higher than the density of the other part excluding the four faces. This feature ensures that a post finishing step is not required and enhances the alignment.

Japanese Pat. Appl. No. 2003-2510898 proposes a method of forming a cushion wherein a three-dimensional structure is placed in a female mold. The three-dimensional structure is made from solid and/or hollow continuous filaments and/or short filaments with random loops or curls made of at least a thermoplastic resin and brought into contact with one another to be tangled with voids at a specific bulk density. The female mold and/or the three-dimensional structure are heated to a specific temperature required for thermally softening the three-dimensional structure. The female mold is mated with a male mold with the three-dimensional structure inbetween and clamped down. The three-dimensional structure is allowed to cool down and cure. The cushion is formed to have a volume corresponding to the stroke of the male mold mating with the deep-drawing female mold.

The method described in Japanese Pat. Appl. No. 2003-2510898 is easier than secondary processing of urethane foam and meets the more specific needs than the secondary processing of urethane foam. The compression molding method enables formation of any original shape conforming to the individual build, thus providing high-value-added products. The thickness of the cushion is controllable with only one mold. This can satisfy the diverse requirements for the characteristics of various products without providing a wide variety of molds. For example, the longer stroke produces the thinner cushion, while the shorter stroke produces the thicker cushion. This facilitates production of the cushion and meets diverse requirements for the characteristics of various products, such as custom-made cushions. Additionally, the spring-like characteristics may be controlled freely by changing the diameter, the material, the denier, the bulk density or the porosity of the filaments of the three-dimensional structure. While the spring characteristics of the material are unchanged, squeezing by compression molding changes the cushioning effect and varies the load distribution.

The method described in Japanese Pat. No. 4350286, however, requires post-processing by secondary formation according to the requirements of the materials to be produced, for example, to make the rounded edge or to form a recess for chairs. Such secondary formation is required especially for the flame-retardant seat cushion for aircraft to form a recess and make the rounded or flat edge corners. Such secondary formation is extremely complicated and troublesome. On the other hand, in the method described Japanese Pat. Appl. No. 2003-2510898 the three-dimensional netted structure is heated and thermally softened, the mold is closed for compression molding, and then cooled down, e.g., with water, to cure the three-dimensional netted structure, and, thereafter, the three-dimensional netted structure is removed from the mold. The mold is large and thereby needs a significantly long time to repeat the heating and the cooling steps. The three-dimensional netted structure cannot be removed from the mold until the temperature of the mold is sufficiently low. This increases production time and lowers production efficiency.

BRIEF SUMMARY OF THE INVENTION

In order to solve at least part of the above-described problems, one object of the invention is to shorten the mold release time for releasing the three-dimensional netted structure from the mold. Shortening the mold release time can improve production efficiency.

In order to achieve the foregoing advantages, the three-dimensional netted structure is directly heated to enhance the efficiency, instead of heating the mold as described in Japanese Pat. Appl. No. 2003-2510898. Additional embodiment of the invention are described hereinbelow.

Definitions

The "heating medium" may, for example, be steam, hot blast or hot water. The "coolant" may be liquid or cold air.

The "three-dimensional netted structure" may be a netted structure made from a plurality of continuous filaments respectively formed in random loops and brought into contact with one another to be tangled with voids at a specified bulk density. The "continuous filaments" are tangled at random in loops by extrusion and are made to partly adhere to one another with heat, so as to form the spring-like structure.

The "three-dimensional netted structure" may be made of a thermoplastic resin as the material, for example, polyolefin resin such as polyethylene (PE) or polypropylene (PP), polyester such as polyethylene terephthalate, polyamide such as nylon 66, vinyl chloride resin such as polyvinyl chloride, or styrene resin such as polystyrene.

The polyethylene (PE) may be low-density polyethylene (LDPE), linear low-density polyethylene (LLDPE), very-low-density polyethylene (VLDPE), high-density polyethylene (HDPE), or ethylene-vinyl acetate copolymer resin (EVA).

The material may otherwise be a copolymer copolymerized with any of the above resins as the base, an elastomer or a resin mixture containing any of the above resins, or may be a recycled material or a material mixture containing a flame retardant, a non-flammable material and/or an antimicrobial agent.

The material may be a mixture of the "thermoplastic resin" with vinyl acetate resin (hereinafter referred to as VAC), ethylene-vinyl acetate copolymer (hereinafter referred to as EVA) or styrene butadiene styrene (hereinafter referred to as SBS), etc. For example, the material may be a mixture of a polyolefin resin with vinyl acetate resin, ethylene-vinyl acetate copolymer or styrene butadiene styrene. The material may be a mixture (for example, thermoplastic elastomer) of the polyolefin resin such as PE or PP and VAC, EVA or SBS.

The mixing ratio of the polyolefin resin to the vinyl acetate content of VAC or EVA is 70 through 97 percent by weight to 30 through 3 percent by weight or preferably 80 through 90 percent by weight to 20 through 10 percent by weight. The VAC or EVA content of not greater than 3 percent by weight may cause the low impact resistance, while the content of not less than 30 percent by weight may cause the poor thermal properties. The mixing ratio of the polyolefin resin to SBS is 50 through 97 percent by weight to 50 through 3 percent by weight or more preferably 70 through 90 percent by weight to 30 through 10 percent by weight. The polyolefin resin may be recycled resin.

The "continuous filaments" may be solid or hollow. In the hollow continuous filaments, the air is trapped in the tubular structure of the filaments. This advantageously provides the characteristics of the air spring and thereby the specific cushioning effect and also prevents buckling. Inclusion of the air keeps the rigidity of the three-dimensional structure. The hollow may be continuous or discrete. One filament may include a hollow section and a solid section. The mixing ratio of the solid filaments to the hollow filaments is preferably 10 through 80 to 90 through 20. The arrangement of locating the hollow filaments in the center area and placing the solid filaments to surround the periphery of the hollow filaments advantageously gives good touch.

The diameter of the solid "continuous filaments" is preferably 0.3 to 3.0 mm or more preferably 0.5 to 1.0 mm. The solid filaments having the diameter of not greater than 0.3 mm have the low tenacity, which increases the adhesion area and thereby decreases the porosity. The solid filaments having the diameter of not less than 3.0 mm have the excessive tenacity, which prevents formation of loops or curls to decrease the adhesion area and thereby decrease the strength. The diameter of the hollow "continuous filaments" is preferably 0.6 to 3.0 mm or more preferably 0.9 to 1.5 mm. The void rate of not higher than 10% does not have contribution to weight reduction.

The bulk density of the "three-dimensional netted structure" is 0.03 to 0.20 $g/cm^3$ or preferably 0.05 to 0.15 $g/cm^3$. The bulk density of not higher than 0.03 $g/cm^3$ decreases the strength, while the bulk density of not lower than 0.11 $g/cm^3$ does not substantially reduce the weight and eliminates the elasticity. The "three-dimensional netted structure" may not have a uniform density as the whole but may have a varying-density structure at predetermined intervals or at adequate intervals. In this structure, the bulk density in the coarse part is 0.03 to 0.13 $g/cm^3$, preferably 0.04 to 0.11 $g/cm^3$ or more preferably 0.05 to 0.09 $g/cm^3$. The bulk density in the dense part is 0.04 to 0.20 $g/cm^3$, preferably 0.05 to 0.15 g/cm3 or more preferably 0.06 to 0.13 $g/cm^3$.

The three-dimensional netted structure of varying density may be compressed with a mold to have a lower density at an area where a wrinkle may occur. This results in a formed product without any wrinkles.

The porosity of the "three-dimensional netted structure" is 80 to 98%, preferably 90 to 97% or more preferably 91 to 96%. The porosity of this range is preferable to maintain the elasticity and the strength as the cushion and reduce the weight:

$$[\text{Porosity (\%)}]=(1-[\text{bulk density}]/[\text{resin density}])\times 100\%$$

The method of forming the cushion is applicable to form the "cushion" used for seating, lying or riding, for example, any of health appliances, vehicle seats of, e.g., automobiles, motorbikes, bicycles, trains and aircraft, saddles for horse-riding, chairs, sofas and beds. This method is especially preferable to form the vehicle seat cushion of, for example, aircraft, rockets, trains, ships and boats, and submarines.

The applicable range of this method is not limited to these examples, but the method is widely applicable to form the cushion used for seating, lying or riding with or without vibration, as the alternative of the conventional urethane foam seat cushion.

The "mold" is preferably made of metal, plastic, or concrete.

The structure may be cooled down by natural cooling or by forcible cooling (by the air or water).

Advantages of the Invention

The method of forming the cushion described herein shortens the mold release time of releasing the three-dimensional netted structure from the mode, thus improving the production efficiency.

In certain embodiments of the method, the compression step is performed prior to the thermal softening step. This may reduce the amount of heating required for softening.

In certain embodiments of the method, the thermal softening step is performed prior to the compression step. This enables even a material requiring a relatively long softening time to be adequately treated.

In certain embodiments of the method, the compression step and the thermal softening step are performed simultaneously. This shortens the working time.

In certain embodiments of the method, the mold has an opening, so that a heat medium or a coolant can be supplied through the opening. This enables size reduction.

In certain embodiments of the method, the method includes an additional compression step of additionally compression-forming a compressed part of the three-dimensional netted structure, wherein an end area of the additionally compression-formed part is formed to a fastening rim for fastening the three-dimensional netted structure to another object. This does not require production of a separate fastener, thus improving the working efficiency and reducing the cost.

In certain embodiments of the method, the end area has a lower density than the density of another area. This produces a product having a less variation in density.

In certain embodiments of the method, the method further includes a surface treatment step or an adhesive spray step. This is convenient for antistatic treatment or flame-retardant treatment.

In certain embodiments of the method, the method further includes an adhesion step of bonding cloth to the three-dimensional netted structure. This is suitable to manufacture, for example, seats.

In certain embodiments of the method, the method is performed in combination with a method of processing the formed three-dimensional netted structure by hot press, high-frequency wave, or ultrasonic wave. The formed object is accordingly subjected to secondary formation by further heating, further depression, adhesion or fusion to form a desired shape and provide an additional function.

In certain embodiments of the method, the thermal softening step thermally softens the three-dimensional netted structure by hot press, by high-frequency heating or by ultrasonic wave. This advantageously shortens the process time.

In certain embodiments of the method, the thermal softening step includes a pre-heating step and a main thermal softening step. This advantageously shortens the process time.

BRIEF DESCRIPTION OF THE DRAWINGS

The invention is described hereinbelow with reference to accompanying drawings, in which:

In FIGS. 4 to. 8 and 15 to 18, the random curled texture of the three-dimensional netted structure of the seat cushion has been omitted from the illustration and only its contour line is shown.

DETAILED DESCRIPTION OF THE INVENTION

The following describes the method of forming a seat cushion from continuous filaments tangled at random in loops and made to partly adhere to one another with heat according to certain embodiments of the invention, with reference to the accompanied drawings.

The seat cushion 1 (hereinafter referred to as "cushion 1") is made from a three-dimensional structure 2 (hereinafter referred to as "structure 2") made of a material that may be a mixture (e.g., thermoplastic elastomer) of a thermoplastic resin, e.g., polyolefin resin, such as PE or PP and VAC, EVA, or SBS.

Figure 9:
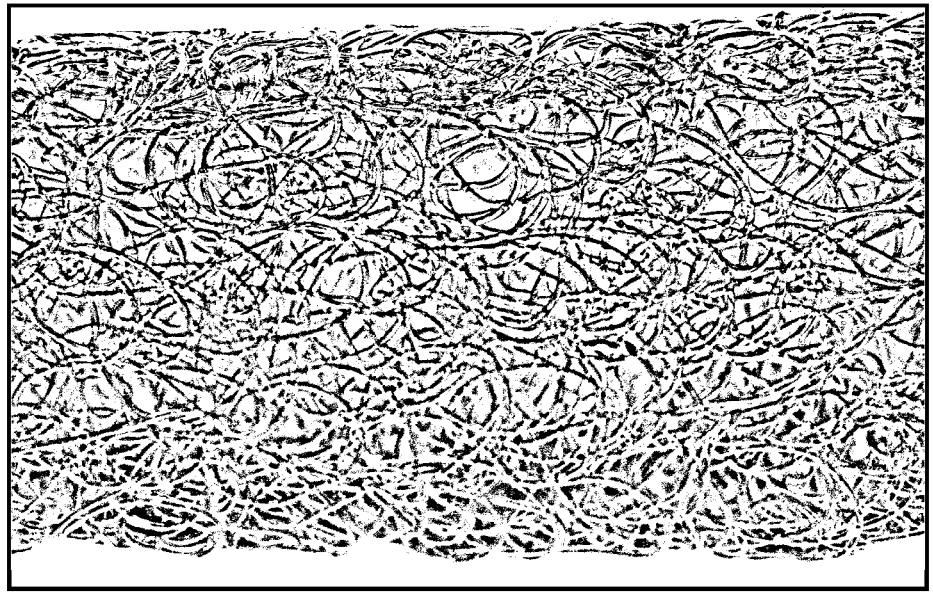
FIG. 9 shows the formed surface of a three-dimensional netted structure according to an exemplary embodiment.
Figure 10:
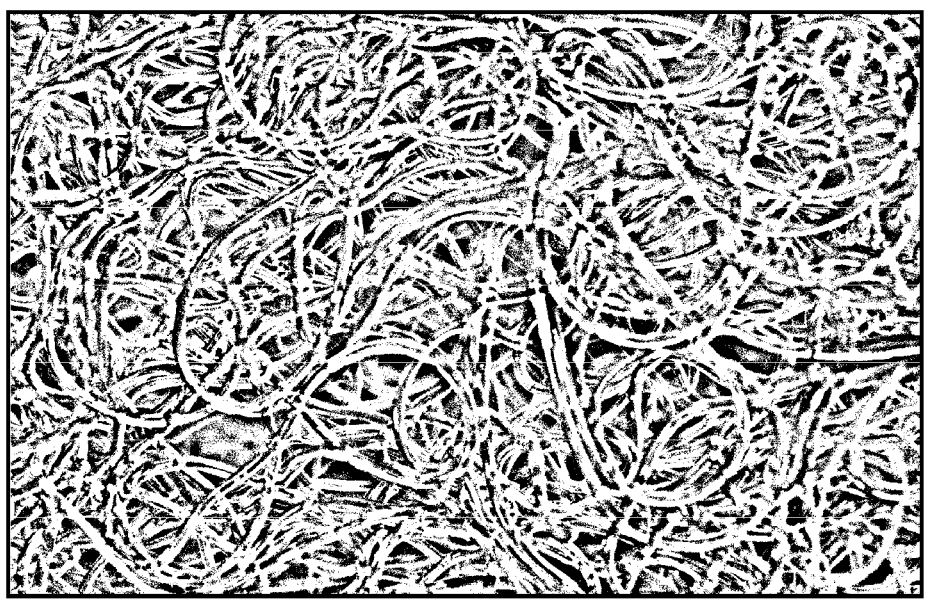
FIG. 10 is an enlarged image view of FIG. 9.
Figure 11:
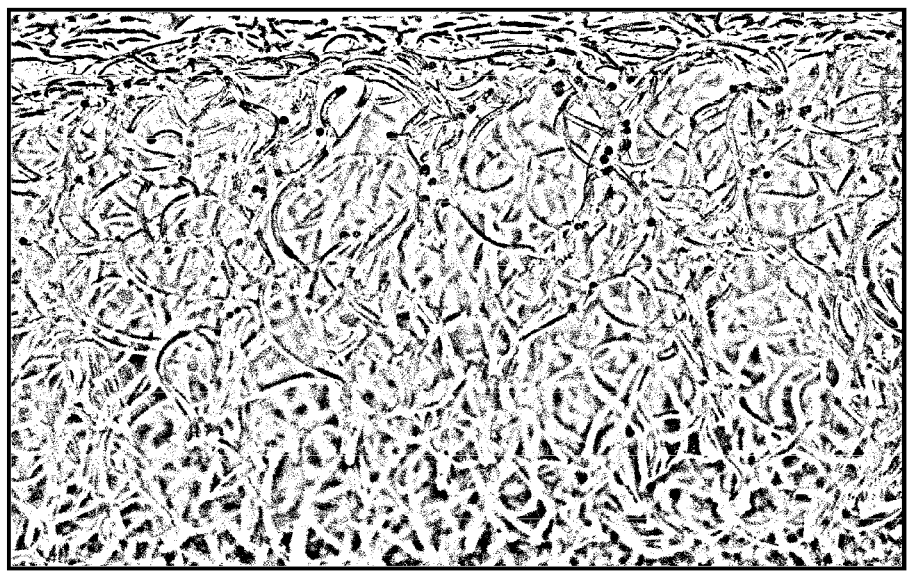
FIG. 11 shows the end face of the three-dimensional netted structure according to an exemplary embodiment.
Figure 12:
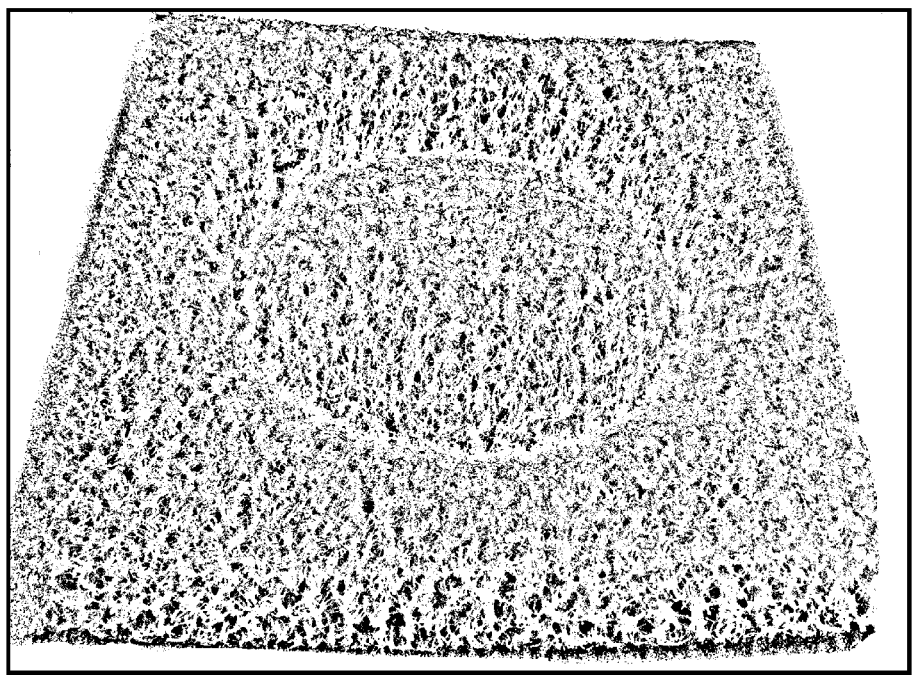
FIG. 12 is a perspective surface side view showing a formed object according to an embodiment of the invention.
Figure 13:
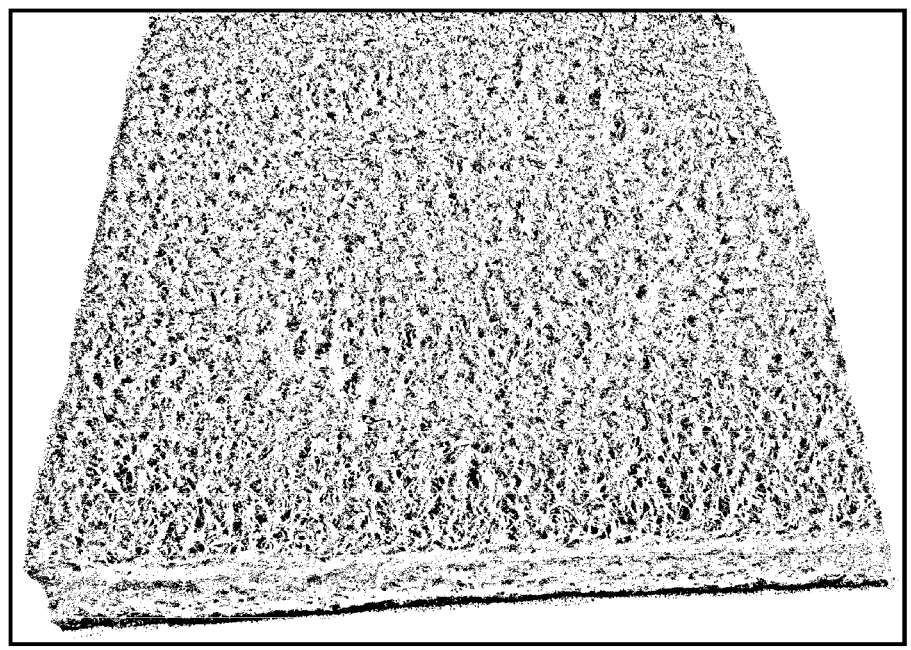
FIG. 13 is a perspective rear face view showing a formed object according to an embodiment of the invention.

Three or four of the four surfaces of the structure 2, with the exception of its two end faces relative to the extruding direction, are formed during the curing step and generally have a higher density than that of the other area. The structure 2 is formed in a rectangular prism having a total of six faces including the top face, bottom face, left side face and right side face (see FIGS. 9 and 10) and two cut end faces (see FIG. 11). The details of the structure 2 will be described below.

Figure 14:
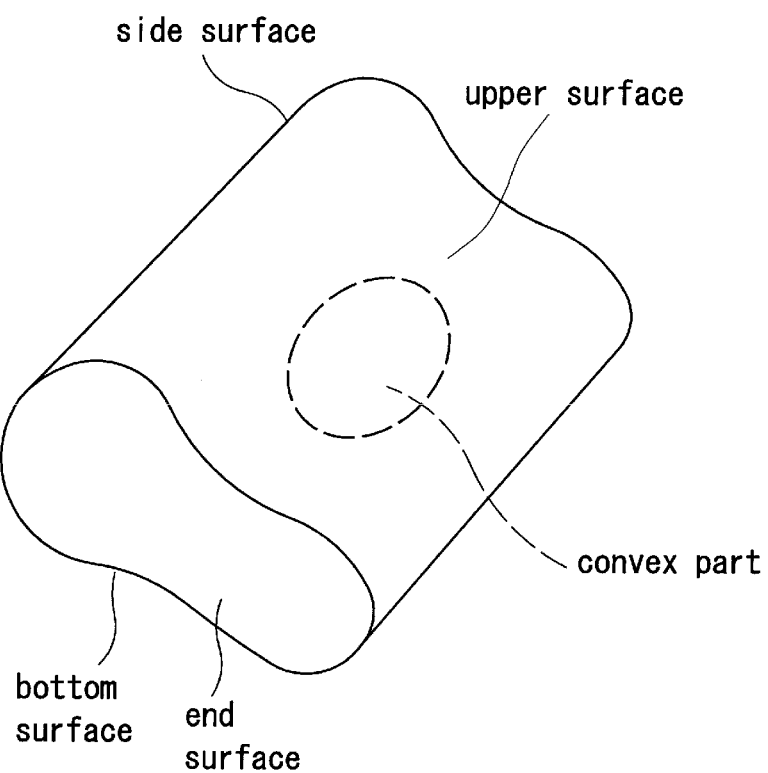
FIG. 14 illustrates a three-dimensional netted structure that requires processing.

The forming method of the embodiment is performed for, for example, recess formation and end-face processing, as shown in FIG. 14. The recess formation may form a recess conforming to, for example, the shape of the legs, the shape of the back or the shape of the buttock. The recess may be formed by pressing a target area of the structure with a mold and exposing the structure to steam. The end-face processing may press the end faces of the structure 2 to form thinner-walled areas.

The method according to a first embodiment has the following steps:

(1) compression step of compressing the structure 2 with a mold 3;
(2) thermal softening step of thermally softening the structure 2 with a heating medium;
(3) curing step of directly and forcibly cooling down the structure 2 with a coolant to cure the texture; and
(4) mold release step of releasing the structure 2 from the mold 3.

Figure 1:
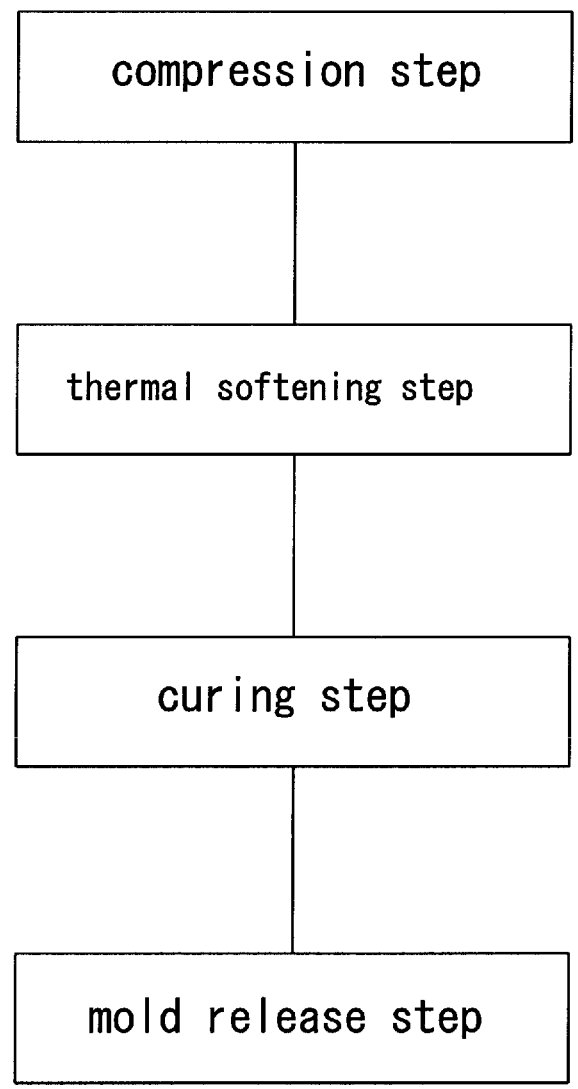
FIG. 1 shows a block diagram illustrating a process flow of an exemplary embodiment according to the method of forming a cushion of the invention.
Figure 2:
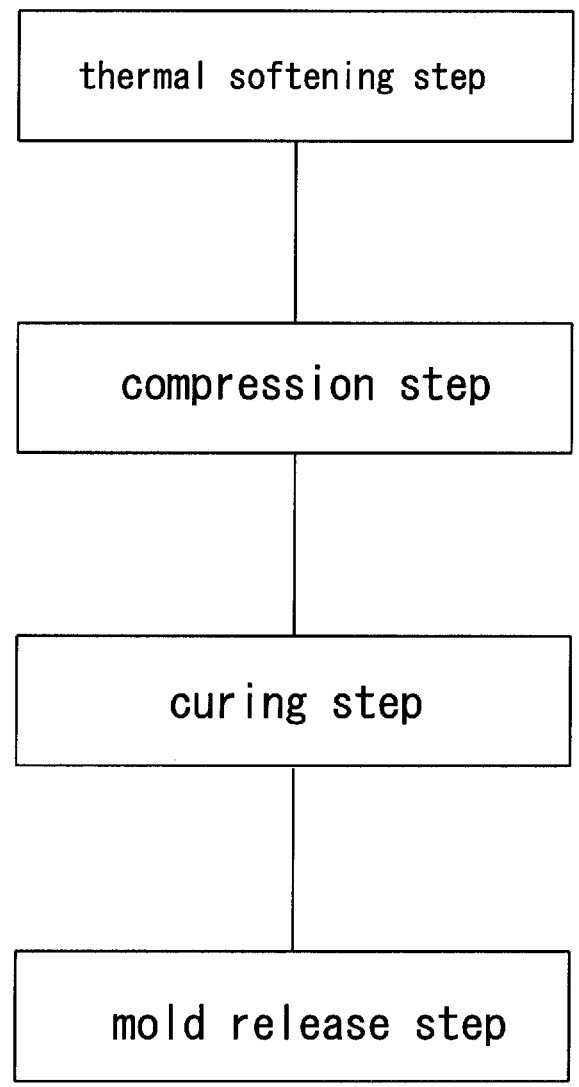
FIG. 2 shows a block diagram illustrating a process flow of another embodiment according to the method of forming a cushion of the invention.
Figure 3:
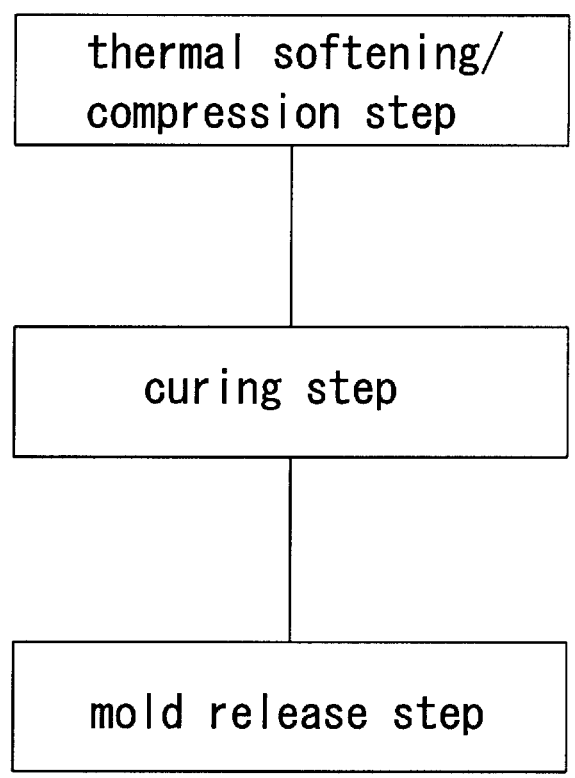
FIG. 3 shows a block diagram illustrating a process flow of yet another embodiment according to the method of forming a cushion of the invention.
Figure 4:
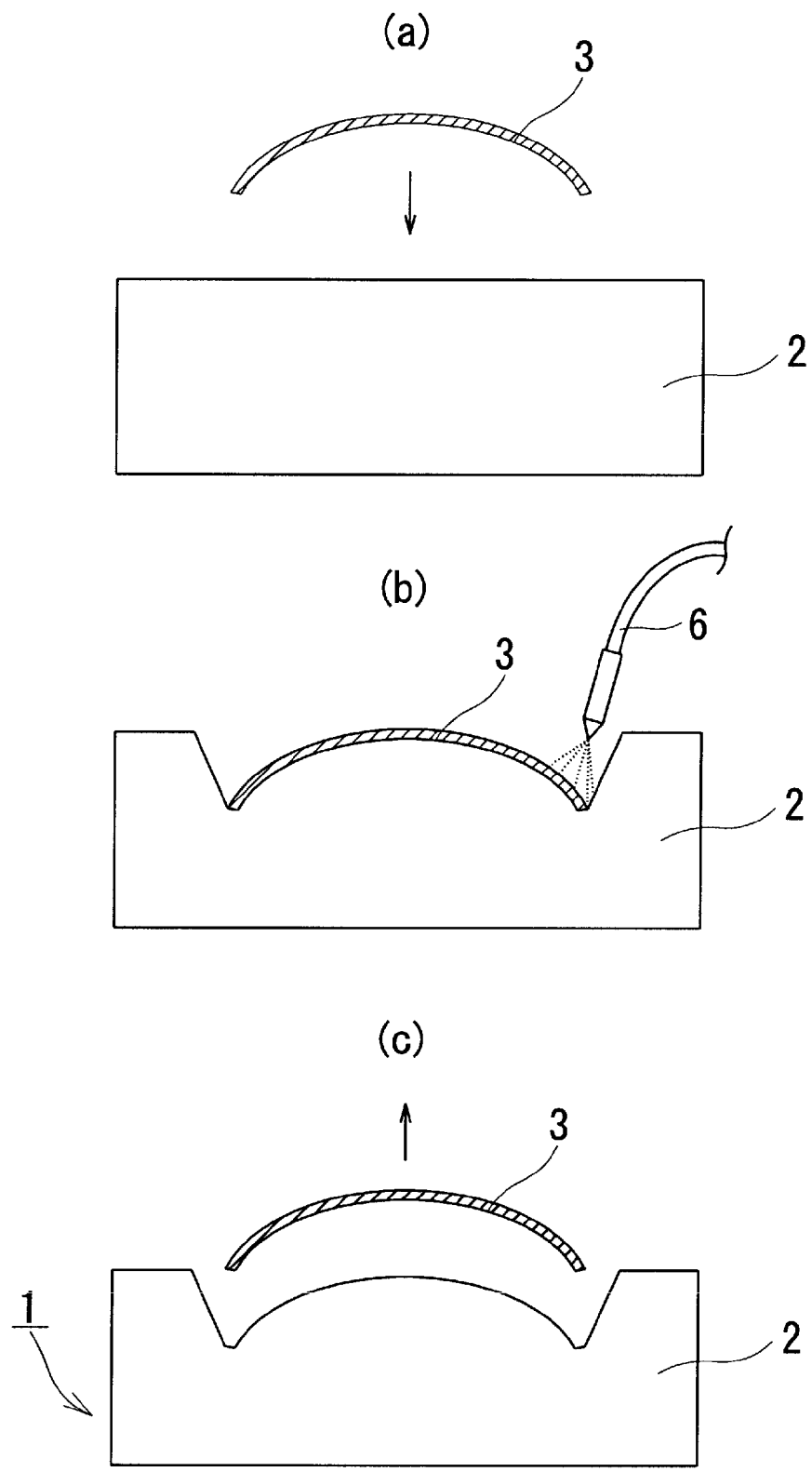
FIG. 4 illustrates a process flow of an exemplary embodiment corresponding to the block diagrams in FIGS. 1-3.
Figure 5:
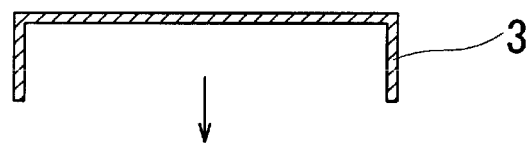
FIG. 5 illustrates another process flow of an exemplary embodiment corresponding to the block diagrams in FIGS. 1-3.
Figure 5:
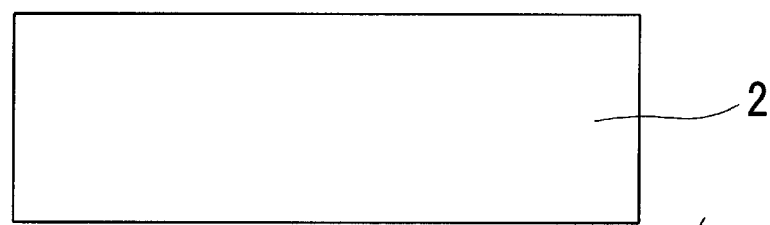
Figure 5:
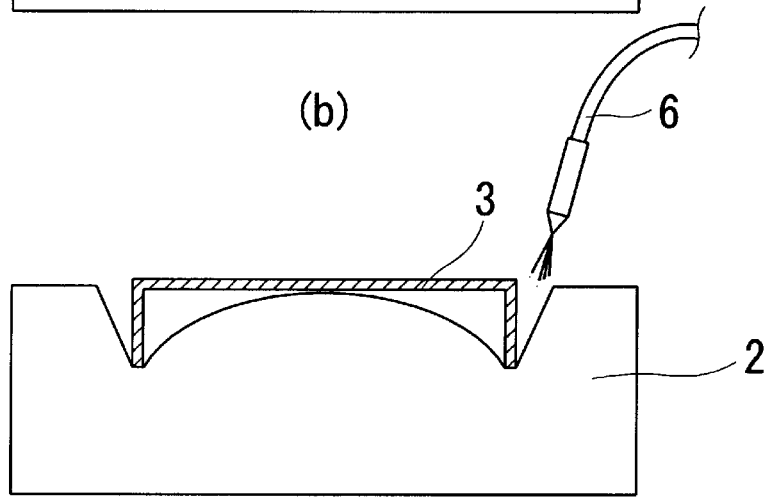
Figure 5:
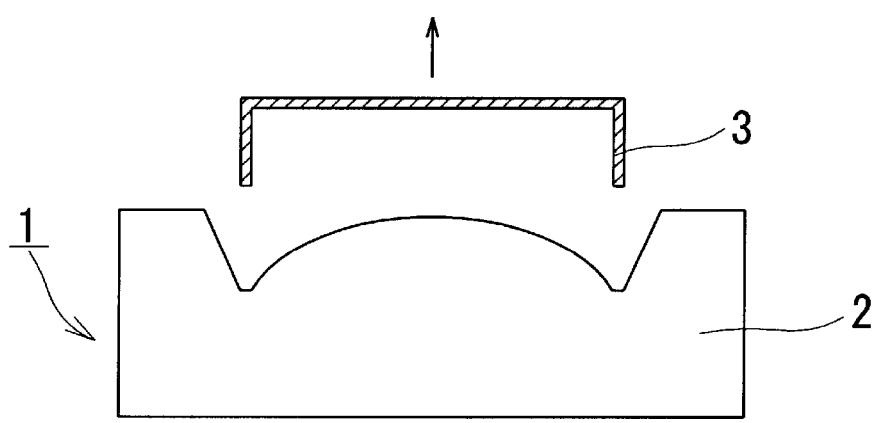

In step (1), the structure 2 is compressed to be deformed with the mold 3 and kept in the compressed state for a predetermined time as shown in FIGS. 4(a) and 5(a).

The mold 3 has the shape conforming to a target form. For example, the mold 3 may have a downward curved shape, e.g., a dish shape, to form the curved convex part. This forms the partial area of the structure 2 to a curved shape (for example, R shape). The mold 3 may be provided with or without holes. In the former case, the number of holes may be selected arbitrarily according to the forming conditions, and the arrangement of the holes may be set adequately. One preferable example of the mold 3 is a dish-shaped punching metal member 3 with openings 4 shown in FIG. 6(a). Another preferable example of the mold 3 is a dish-shaped mesh metal member 3 shown in FIG. 6(b). The mesh metal member 3 includes a mesh 30, meshed openings 4 and a circular edge member 5 provided on the circumferential end to have the larger diameter than that of the mesh 30. The mechanical force of a pressing machine may be applied for compression.

In step (2), the structure 2 is softened with supply of heat. Heating the structure 2 with the heating medium may spray steam, blow hot blast or spray hot water. The forming method of this embodiment requires a temperature of or above the thermal softening temperature of the material resin of the filaments in the structure 2. The heating temperature of the structure 2 is preferably not higher than 100 degrees Celsius. The cushion 1 may, however, be formed at the temperature above 100 degrees Celsius by taking into account the melt temperature of the resin, such as heat-resistant resin. The temperature range of the heating medium may be set to include a wide range of low temperature to high temperature by taking into account the forming conditions, and may be, for example, 40 to 200° C. The direct supply of the heating medium to the structure 2 may directly supply the steam to the voids of the three-dimensional netted structure.

Figure 6:
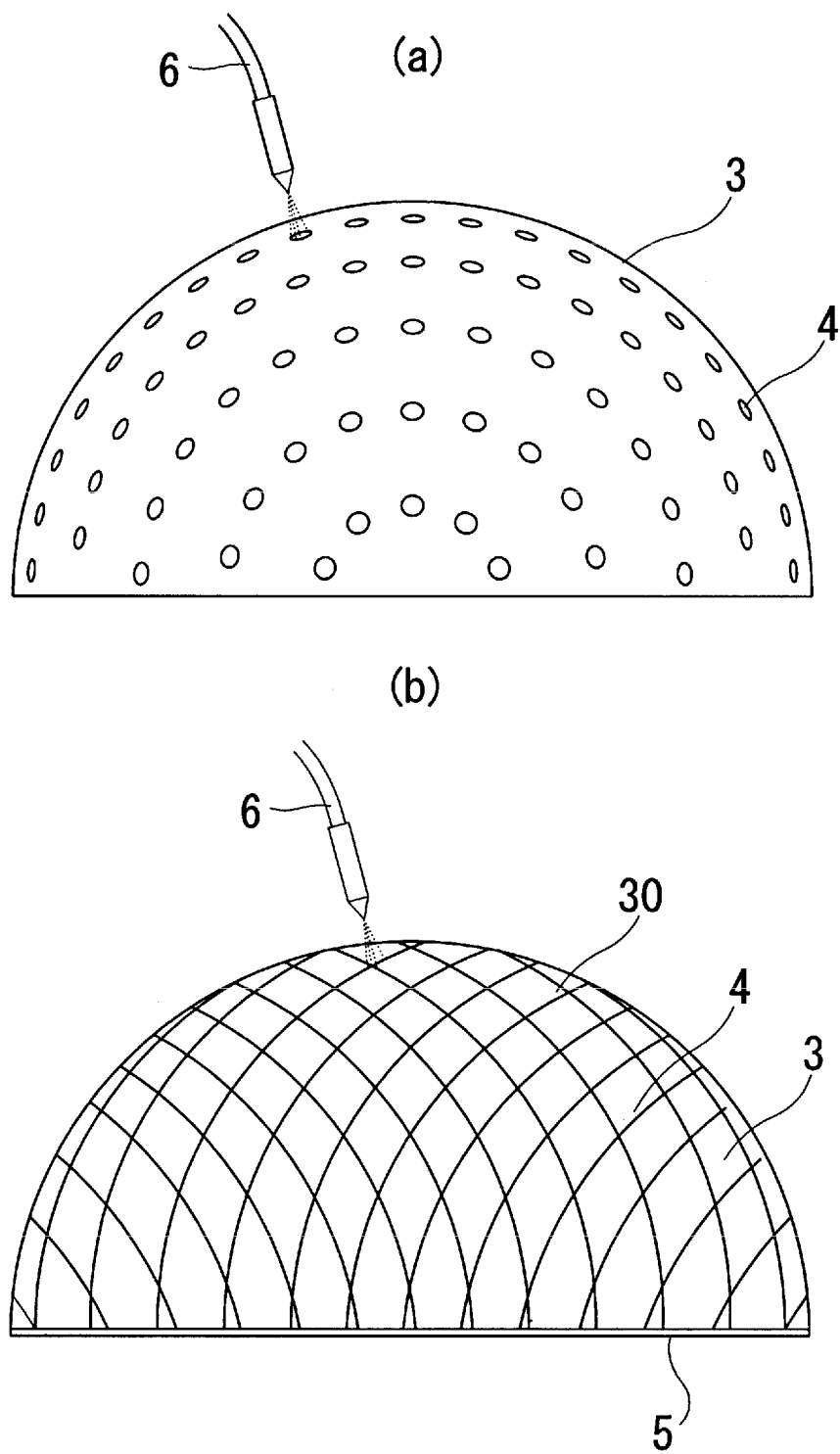
FIG. 6(a) is a partial cross-sectional front view illustrating an exemplary mold.
FIG. 6(b) is a partial cross-sectional front view illustrating another exemplary mold.

The mold 3 is required to have some hole or inlet, and it is preferable to use the openings 4 as shown in FIG. 6 for this purpose. The mold 3 may be a mesh metal member. The excessively large mesh of the mesh metal member may leave the trace of the mesh shape, and the adequate-size mesh is preferable. In the examples of FIG. 6, steam is supplied from a steam nozzle 6 through the openings 4 onto the structure 2. The outlet temperature of the steam nozzle 6 is preferably 90 to 100° C.

Supplying the steam, hot water, or hot blast onto the structure 2 compressed with the mold 3 thermally soften the structure 2. Applying hot water of or approximate to 100° C. may melt and recess the hot water-applied part of the structure 2 made of some resin. Adequate heating is thus required, for example, by applying hot water little by little or by taking into account the temperature conditions.

In step (3), water is applied onto the structure 2 and the mold 3 to cool down and cure the structure 2. For example, water or cold water may be applied onto the structure 2 and the mold 3 from a cooling source (not shown). This forcibly supplies the coolant through the openings 4 onto the structure 2 to forcibly cool down and cure the structure 2.

In step (4), the mold 3 is released from the structure 2. This enables the series of operations including the mold release step to be repeated at extremely short time intervals and thus ensures the good workability.

The method according to a second embodiment has the following steps:

(1) thermal softening step of thermally softening the structure 2 with a heating medium;
(2) compression step of compressing the structure 2 with a mold 3;
(3) curing step of directly and forcibly cooling down the structure 2 with a coolant to cure the texture; and
(4) mold release step of releasing the structure 2 from the mold 3.

The method of the second embodiment performs the thermal softening step and the compression step in the reverse order to that of the first embodiment.

The method according to a third embodiment has the following steps:

(1) thermal softening/compression step of thermally softening the structure 2 with a heating medium, while compressing the structure 2 with a mold 3;
(2) curing step of directly and forcibly cooling down the structure 2 with a coolant to cure the texture; and
(3) mold release step of releasing the structure 2 from the mold 3.

The method of the third embodiment simultaneously performs the thermal softening step and the compression step of the first embodiment or the second embodiment.

The softening step enables the three-dimensional structure of the varying density to be formed homogeneously. This allows the seat cushion to have the hard ends and advantageously improves the durability of the seat cushion.

According to the first to the third embodiments, the mold 3 may be preferably made of a metal plate, a resin plate or a cement plate with openings, and the heating medium may be supplied preferably through the openings 4. It is preferable that the mold 3 has the smaller surface area than the surface area of the structure 2.

According to the first to the third embodiments, the method may further include an additional compression step of additionally compression-forming the compressed part of the structure to form an end area of the structure to a fastening rim for fastening the structure to another object.

Figure 8:
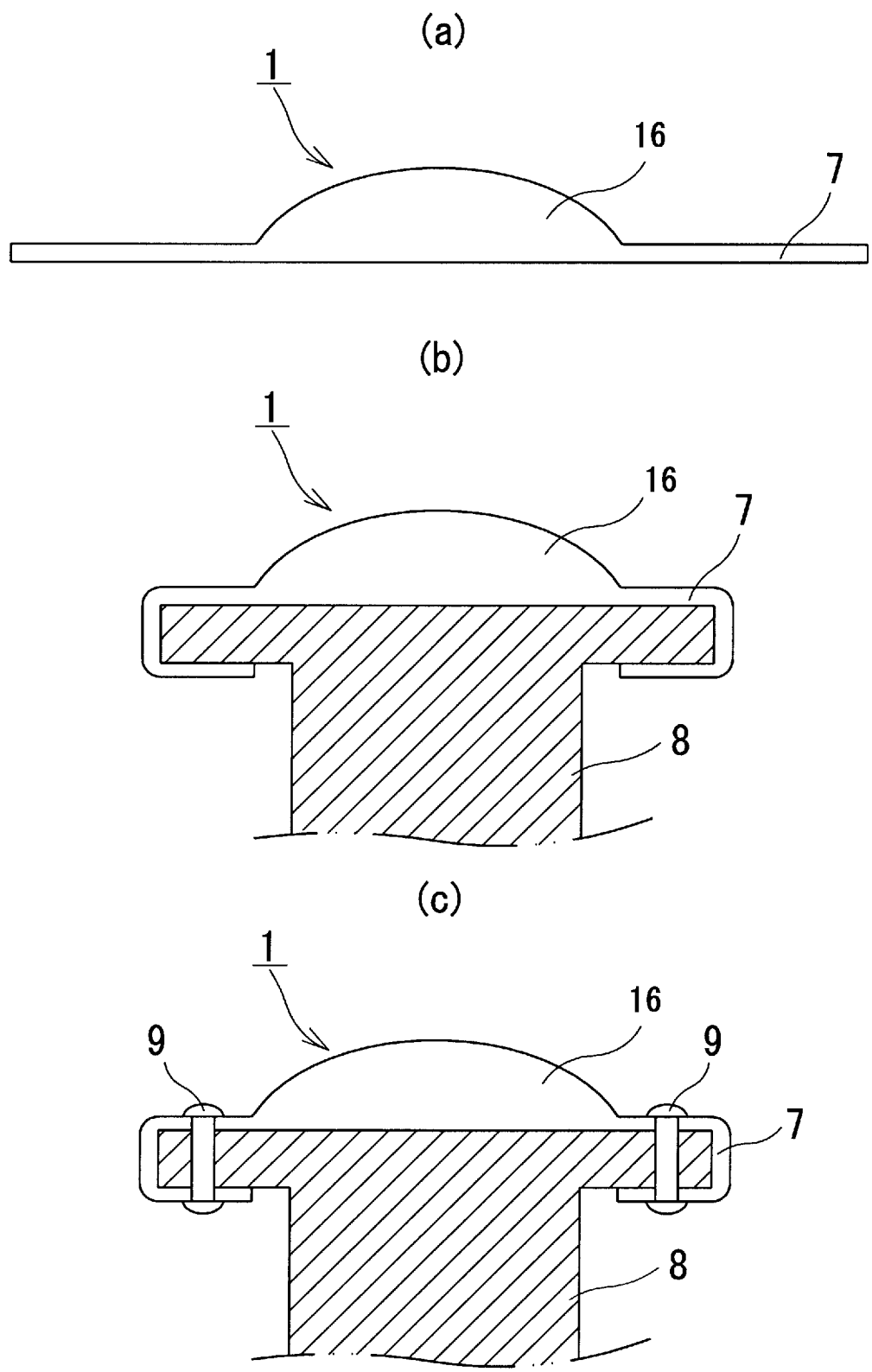
FIGS. 8(a) to 8(c) illustrate a step of end-face processing according to a further embodiment of the invention.

According to the first to the third embodiments, the method may further include an end compression step as the additional step to form an end area of the structure to a fastening rim for fastening the structure to another object. In the illustrated example of a chair cushion, a rim 7 is formed in the peripheral area surrounding a center convex 16 as shown in FIG. 8(a). The rim 7 is folded down to the rear face of the base of a chair 8 as shown in FIG. 8(b) and is secured to the base with attachments 9. The attachment may be a fastener such as rivet or screw or may be a drive clamp (U-shaped needle). The drive clamps are driven from the rear face of the rim to fasten the structure 2 to the chair. A surface layer material, such as artificial leather may be attached simultaneously or may be sewn in a later step. Formation of the rim 7 requires higher-temperature heating with, for example, ultrasonic wave or a heater.

Figure 7:
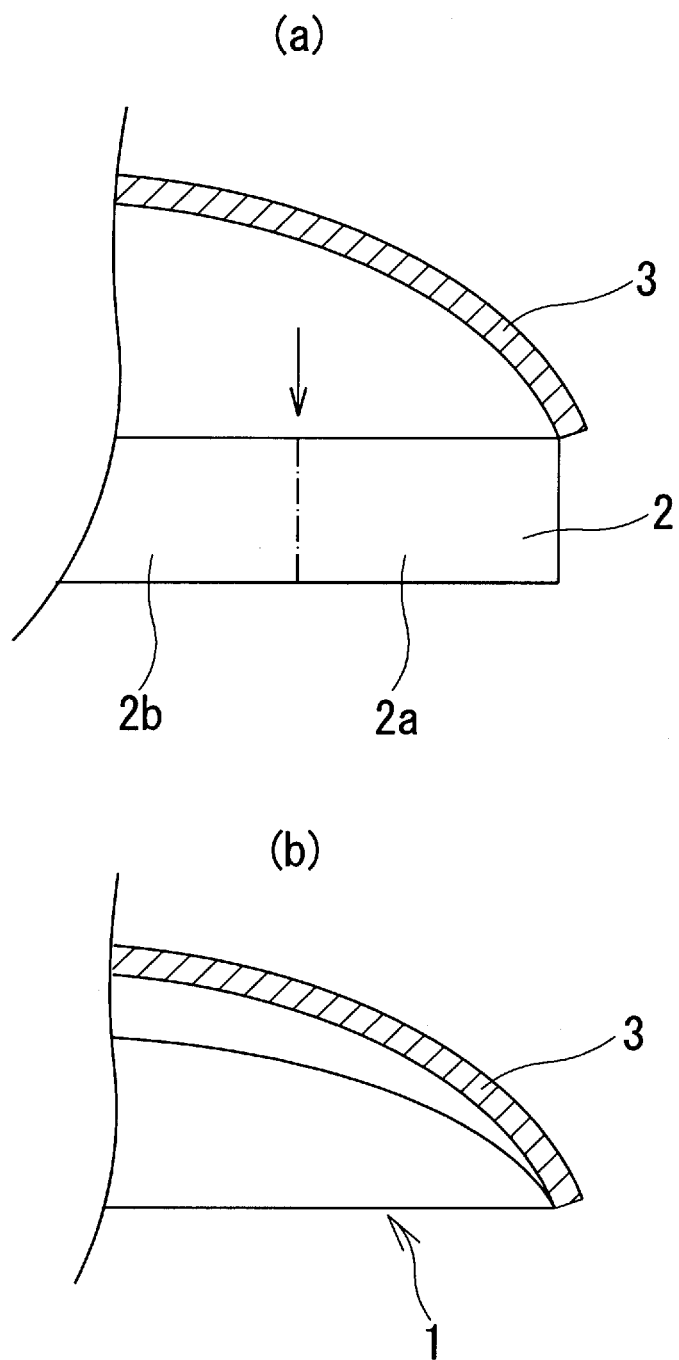
FIGS. 7(a) and 7(b) illustrate a step of end-face processing according to another embodiment of the invention.

According to the first to the third embodiments, an end area 2a is made to have the lower density than another area 2b as shown in FIG. 7. This is because the high density may cause failure in adequately compressing the end area. The end area 2a is easily compressed to crush its texture and thereby have the optimum density. The end area of the lower density is readily crushable, and there is a less variation in density between the end area and another area after the crush. According to another embodiment, the end area 2a may have the high density to be intentionally hardened.

According to the first to the third embodiments, the additional step may be a surface treatment step or an adhesive spray step after the mold release step. The surface treatment may be, for example, flame-retardant treatment or antistatic treatment. The adhesive may be used to bond an additional material, such as a surface material or a decorative material.

According to the first to the third embodiments, the additional step may be an adhesion step of bonding the cloth to the structure 2 after the mold release step.

In one application, a lighting apparatus may be placed behind the cushion for backlighting.

Method of Forming Structure 2

The following describes the structure 2. Refer to Japanese Pat. No. 4350286 or Japanese Pat. Appl. No. 2003-2510898 for the details. The structure 2 of the embodiment is provided as a three-dimensional structure with voids made from continuous filaments of the mixture material tangled at random in a plurality of loops. The filaments may be solid or hollow.

The bulk density of the three-dimensional structure is 0.03 to 0.20 $g/cm^3$, preferably 0.05 to 0.15 $g/cm^3$ or more preferably 0.06 to 0.13 $g/cm^3$. The porosity of the three-dimensional structure is 80 to 98%, preferably 90 to 97% or more preferably 91 to 96%.

The method of forming the structure 2 according to the embodiment may dry-blend the material mixture of the polyolefin resin, such as PE or PP, and the additional component VAC, EVA or SBS as needed basis with a tumbler, a cut feeder or a volumetric feeder or may mix or melt-mix and pelletize the material mixture to pellets and may feed the dry-blended material mixture or the pellets to a hopper of an extruder.

More specifically, the material mixture of, for example, PP and SBS, is mixed at 40 rpm for 15 minutes with a tumbler (KR mixer manufactured by KATO-RIKI MFG. CO., LTD.)

The material mixture is loaded in a hopper of a 90 mφ single screw extruder, is melt-kneaded at a specified temperature (for example, 200 to 260° C.), is melt-extruded at a specified extrusion rate from a large number of nozzles of a specified diameter provided in a molding die, and is drawn with a drawing machine to form solid and/or hollow filaments of a specified diameter (for example, 600 to 90,000 deniers, preferably 3,000 to 30,000 deniers or more preferably 6,000 to 10,000 deniers). The filaments in the molten state are formed to loops of 1 to 10 mm in diameter or preferably 1 to 5 mm in diameter, and the adjacent filaments are brought into contact with one another and are tangled in a bath (in water) to form random loops. The moving rate of a roll or a belt of the drawing machine is set to be lower than the extrusion rate. The upper part of the drawing machine is protruded above the water surface, and the remaining part of the drawing machine is submerged in water. The continuous filaments are drawn with this drawing machine. During the drawing process, the continuous filaments are formed to random loops, and the adjacent loops are partly tangled and are brought into contact with one another to adhere to one another. The continuous filaments are solidified in water and are wound on a wind roll to form a filament assembly (for example, 10 to 200 mm in thickness and 2,000 mm in width). It is preferable that at least part of the tangled contact areas melt-adhere to one another. The filaments may be a mixture of hollow filaments and solid filaments at a specified ratio.

The wound filament assembly is cut into an adequate length with a cutter to the structure 2.

While the filaments formed in loops in water are drawn with the drawing machine, the cushioning properties may be changed by varying the speed of the drawing machine. The bulk density of the three-dimensional structure may be relatively increased to 0.04 to 0.20 $g/cm^3$, preferably 0.05 to 0.15 $g/cm^3$ or more preferably 0.06 to 0.13 $g/cm^3$. The porosity of the three-dimensional structure may be decreased to 80 to 98%, preferably 90 to 97% or more preferably 91 to 96%.

According to one embodiment, before the continuous filaments are brought into contact with the water surface of a water tank, a specific part of the continuous filaments expected to form the peripheral side faces of the resulting filament assembly may be squeezed with the drawing machine to have the increased bulk density. This gives the structure 2 having the surface layer of the higher density. According to another embodiment, before the continuous filaments are brought into contact with an endless belt of a conveyer or a draw roll, the surface of the continuous filaments may be cooled and solidified. This protects the resulting product from the bite of the belt. The loops are preferably formed to have the smooth surface, in order to allow uniform adhesion of the loops.

While the continuous filaments formed to loops in water are drawn with the drawing machine, the speed of the drawing machine may be varied to change the properties of the three-dimensional netted structure. The drawing speed of the drawing machine may be regulated to decrease at specified intervals (for example, 3 to 5 m). For example, the drawing speed of the draw roll may be set to be lowered for a predetermined time period at specified time intervals, for example, with a timer. This may form the three-dimensional netted structure of the varying density including the portions of the higher bulk density formed by the lower-speed drawing at specified intervals (for example, 30 to 50 cm) and the other portions along the longitudinal direction of the three-dimensional netted structure.

The structure 2 formed by the above forming method has, for example, the bulk density of 0.07 $g/cm^3$ and the thickness of 50 mm. The three-dimensional structure may be formed to have one single set of properties or may be formed to have multiple different sets of properties. Refer to the descriptions of Japanese Pat. No. 4350286 and Japanese Pat. Appl. No. 2003-2510898 for the details including production examples of the structure 2 formed by the above forming method and results of their experiments.

As described above, the method of forming the cushion according to the invention is preferably applied to form a seat cushion used for seating, lying or riding with or without vibrations, as the alternative of the conventional urethane foam seat cushion, for example, any of vehicle seats of, e.g., automobiles, motorbikes, bicycles, trains and aircraft, saddles for horse-riding, chairs, sofas and beds.

The method of forming the cushion of the invention is not limited to the above embodiments but may be applied to various other embodiments within the scope of the invention. There may be various modifications and variations made to the embodiments without departing from the scope of the invention. These modification, variations, and equivalents are also included in the scope of the invention.

The structure 2 may have the dimensions of 100 mm to 300 mm in length, 100 mm to 300 mm in width and 30 mm to 150 mm in thickness but is not limited to such dimensions. The structure 2 may be formed to have any arbitrary size depending on its applications for, e.g., infants, elderly people or adults by, for example, melt-cutting, mechanical cutting or hot press.

Figure 15:
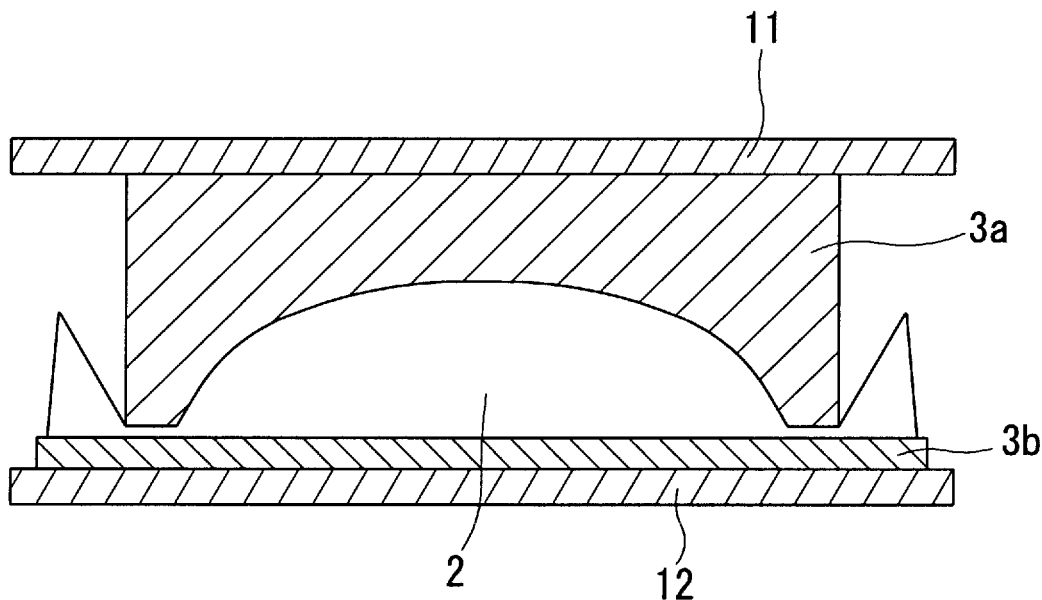
FIG. 15(a) is a partial cross-sectional front view illustrating a thermal softening step according to an exemplary embodiment of the invention.
FIG. 15(b) is a partial cross-sectional front view illustrating a thermal softening step according to another exemplary embodiment of the invention.
Figure 15:
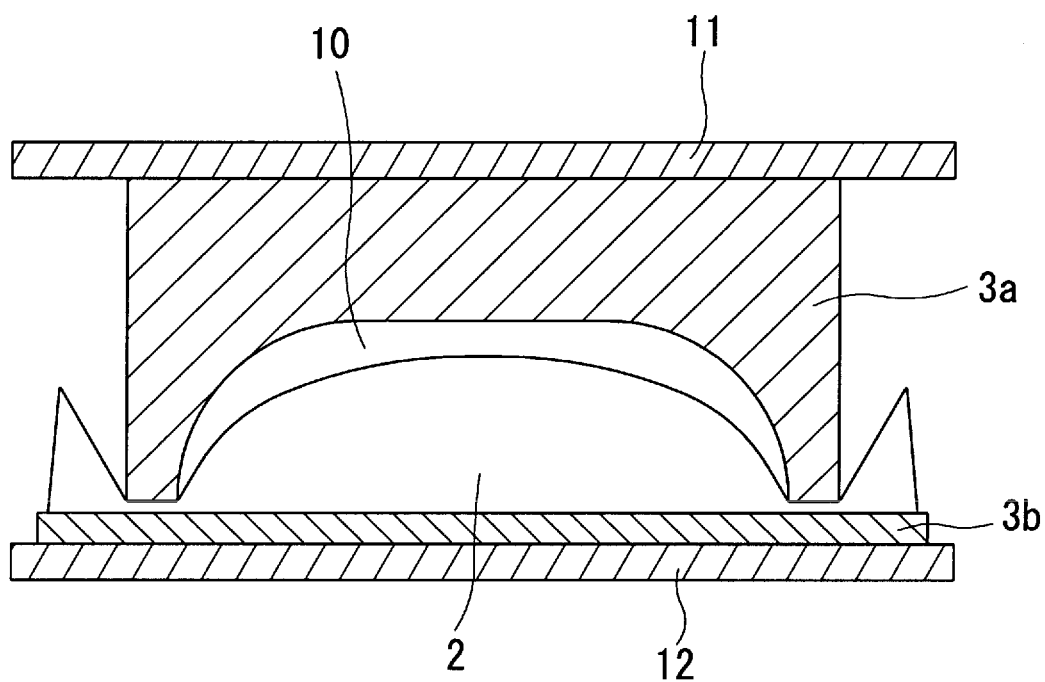

The forming methods according to fourth and fifth embodiments employ hot press for the thermal softening step described in the first to the third embodiments, as shown in FIGS. 15(*a*) and 15(*b*). The structure 2 is placed between a heated upper mold 3*a* and a heated lower mold 3*b*, is partially compressed to be crushed, and is kept in the compressed state. The structure 2 is then released from the upper mold 3*a* and the lower mold 3*b*. In some heating temperature condition, the compressed part of the structure 2 may be molten to a sheet. The upper mold 3*a* and the lower mold 3*b* are preferably metal molds. There is no space between the upper surface of the structure 2 and the upper mold 3*a* in the state of FIG. 15(*a*), while a space 10 is formed in the state of FIG. 15(*b*). In the high heating temperature condition, the upper surface of the structure 2 may be depressed by the heat of the upper mold 3*a* in the state of FIG. 15(*a*). The presence of the space 10 advantageously prevents such depression. The upper mold 3*a* is attached to an upper plate 11, while the lower mold 3*b* is attached to a lower plate 12. In the forming methods of the first to the third embodiments, supplying hot water may cause depression of the structure, while steam may not sufficiently heat the inside of the structure 2. The forming methods according to the fourth to seventh embodiments employ hot press, in order to solve such problems.

Figure 16:
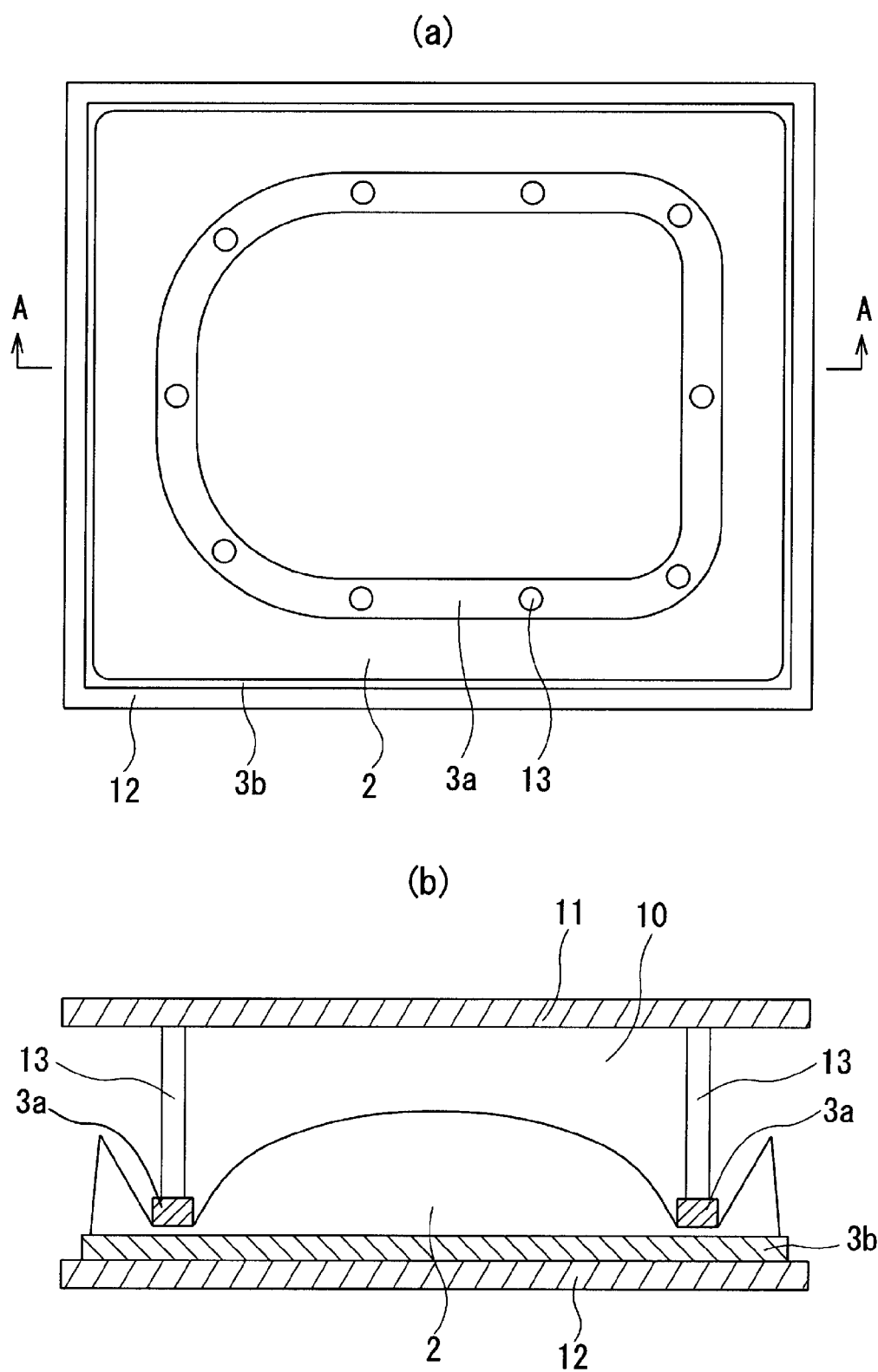
FIG. 16(a) is a partial cross-sectional front view illustrating a thermal softening step according to yet another exemplary embodiment of the invention.
FIG. 16(b) is a plan view illustrating the thermal softening step shown in FIG. 16(a)

The forming method according to a sixth embodiment uses the upper mold 3*a* of the frame structure with compression elements to form the space 10 as shown in FIGS. 16(*a*) and 16(*b*). The frame structure of the mold 3*a* aims to decrease the weight of the upper mold 3*a* and prevent depression on the upper surface of the structure 2, which may occur in some temperature and other manufacturing conditions. The upper plate 11 is omitted from the illustration of FIG. 16(*a*). Support columns 13 have the lower ends fastened to the upper mold 3*a* and the upper ends fastened to the upper plate 11.

Figure 17:
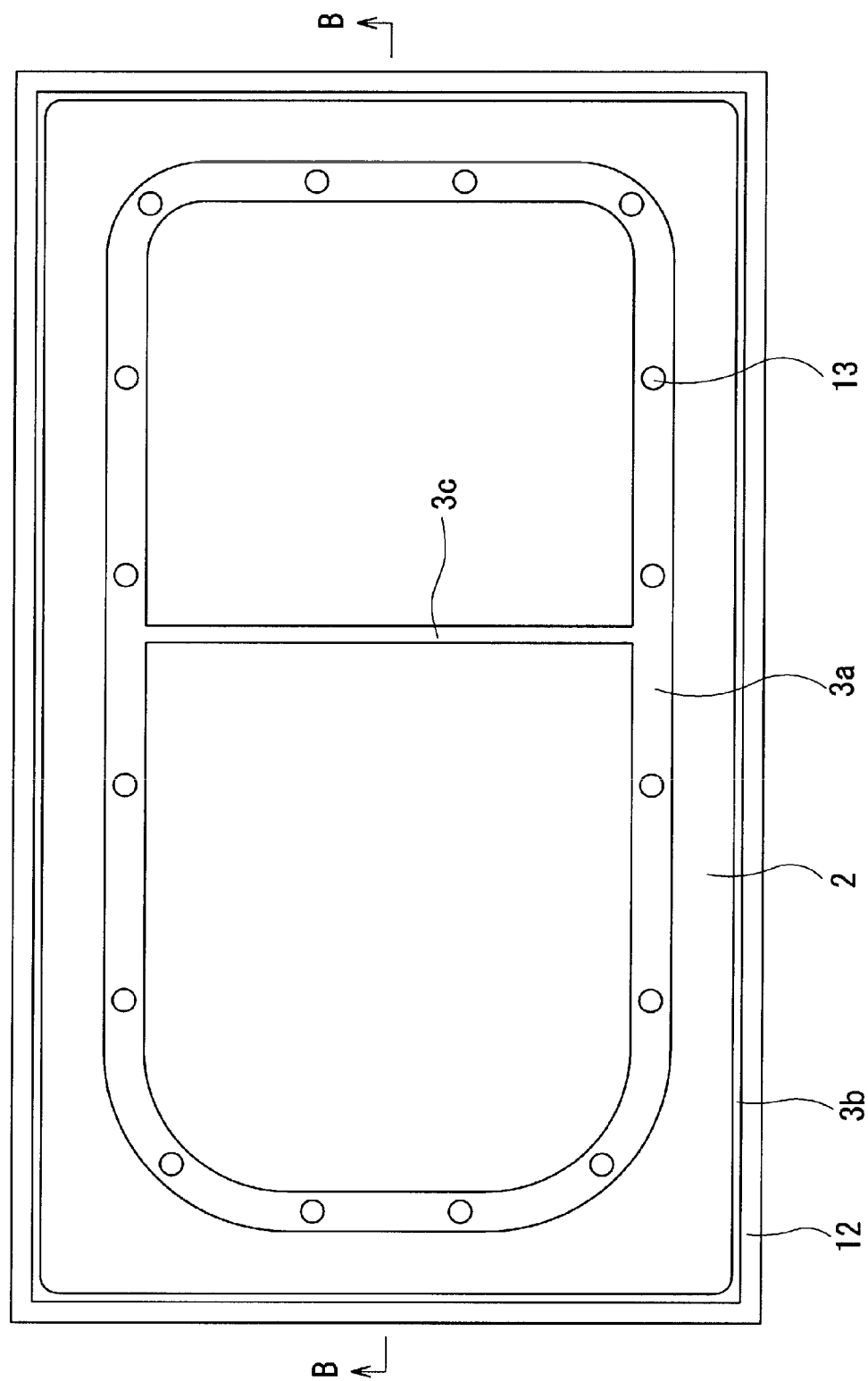
FIG. 17 is a plan view illustrating a thermal softening step according to yet another exemplary embodiment of the invention.
Figure 18:
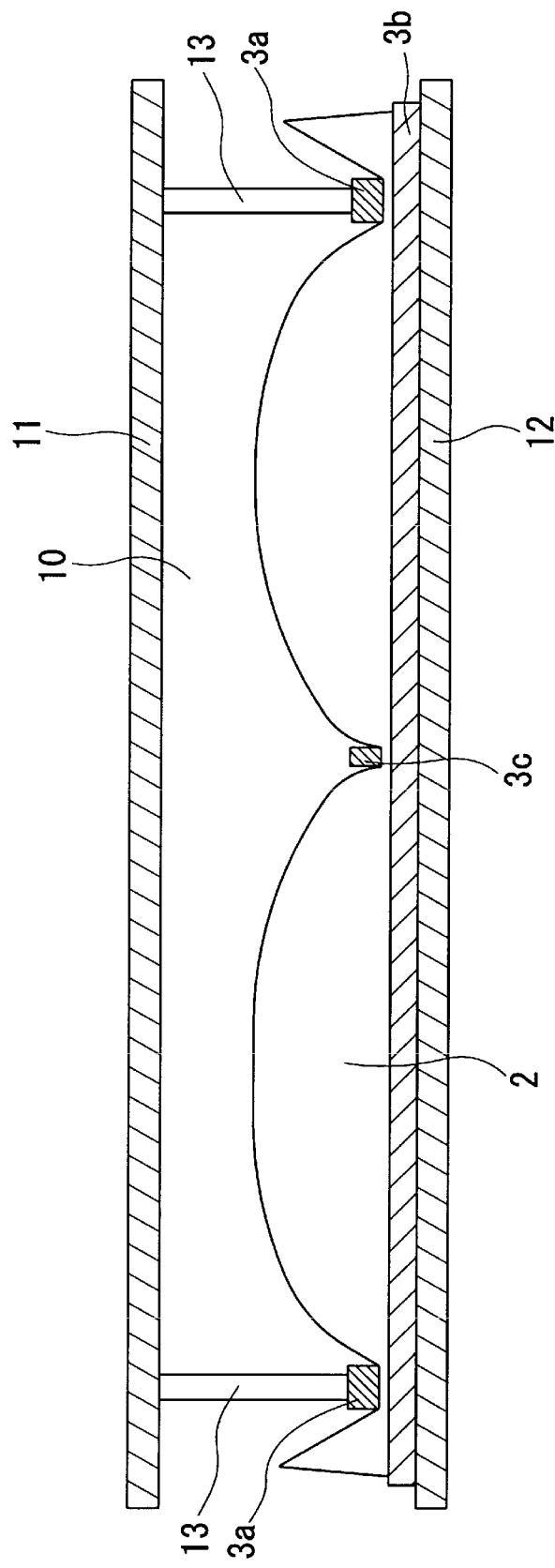
FIG. 18 is a partial cross-sectional front view illustrating the thermal softening step shown in FIG. 17.
Figure 19:
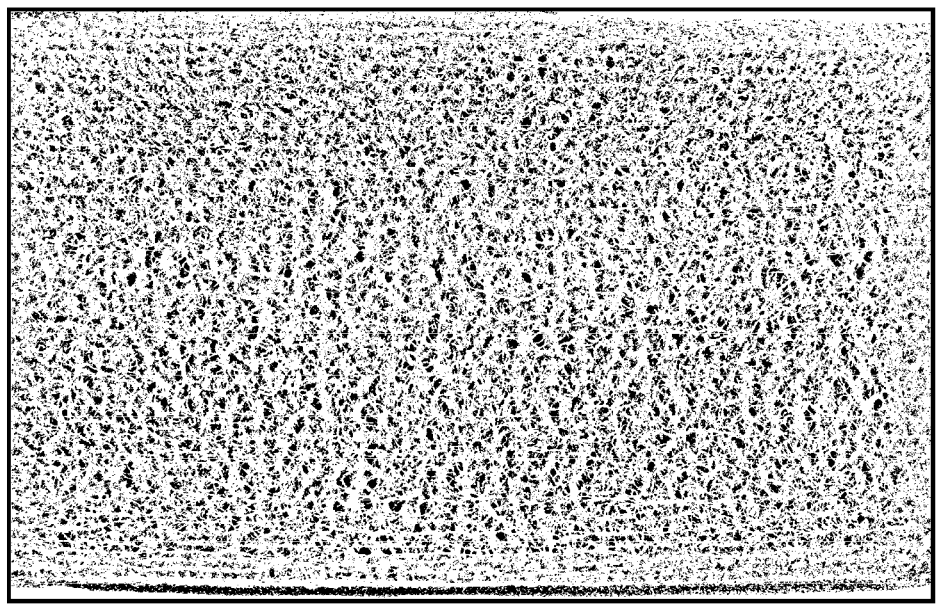
FIG. 19 is a planar image view showing the material of the three-dimensional netted structure according to an exemplary embodiment of the invention.
Figure 20:
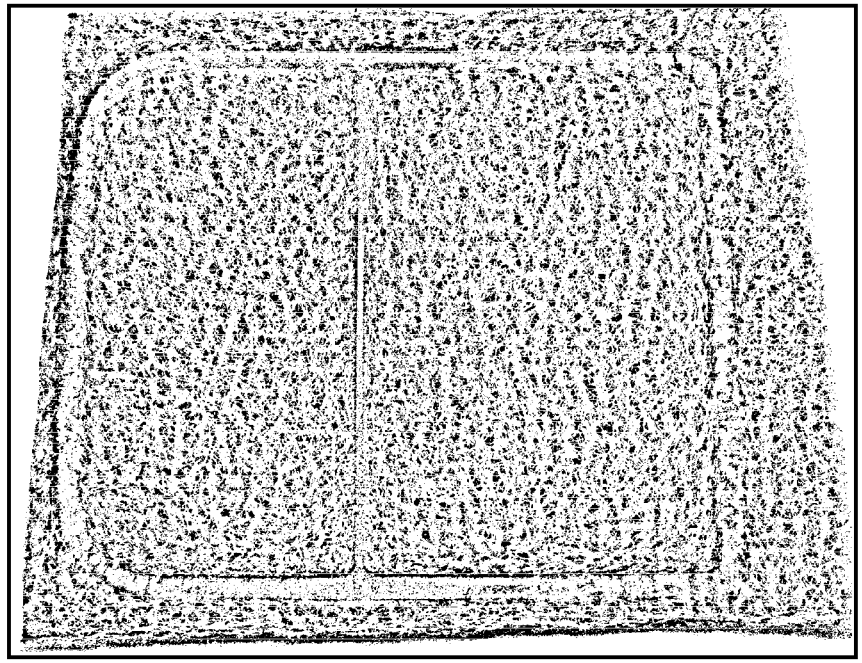
FIG. 20 is a planar image view showing the formed surface of a cushion according to another exemplary embodiment of the invention.
Figure 21:
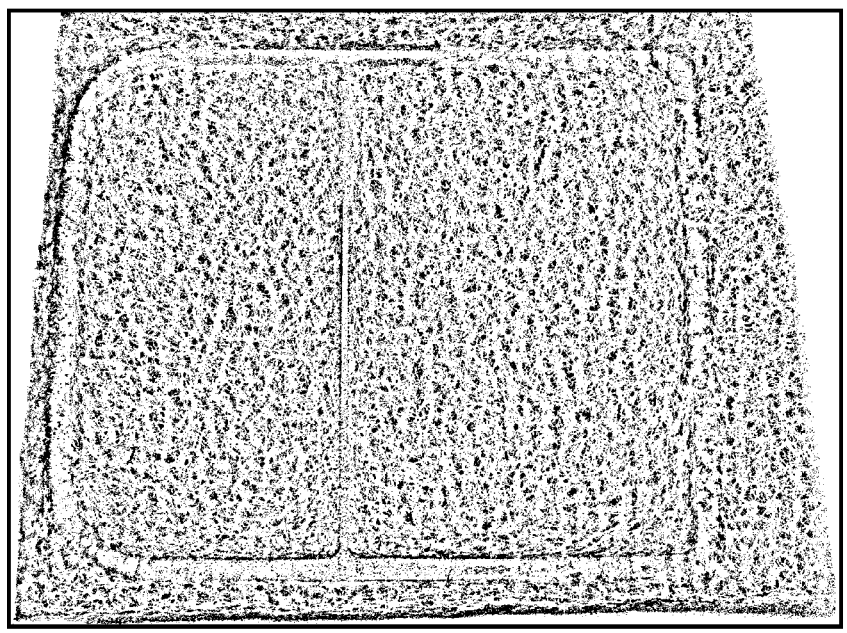
FIG. 21 is a planar image view showing the formed surface of a cushion according to an exemplary embodiment.

The forming method according to a seventh embodiment additionally forms a middle compressed part to the structure of the sixth embodiment as shown in FIGS. 17 and 18. The three-dimensional netted structure 2 has the middle compressed part, in addition to the peripheral compressed parts. For this purpose, the upper mold 3*a* has the frame structure with a partition plate 3*c* provided in the middle of the inner area of the upper mold 3*a* and connected on both ends.

In the forming methods of the fourth to the seventh embodiments, the thermal softening step preferably includes a pre-heating step and a main hot press step. The presence or the absence of pre-heating varies the curvature of the rising shape in the compressed part of the structure 2. Pre-heating increases the curvature. The pre-heating step preferably uses a hot blast tank (the temperature is preferably 70 to 95° C. but may be 95 to 220° C. according to the material and the pre-heating mode). Hot water may be used for pre-heating, but an additional drying step is needed. When PE is used for the material, the pre-heating temperature is preferably 70 to 95° C. and the pre-heating time is preferably 5 to 30 minutes, and the hot press temperature is preferably 110 to 130° C. When polyester elastomer is used for the material, the pre-heating temperature is preferably 80 to 120° C. and the pre-heating time is preferably 1 to 30 minutes, and the hot press temperature is preferably 230 to 280° C. The temperature range and the time range may be adjusted according to the resin used and the mold structure. In order to form a certain shape, the pre-heating step and the main hot press step may be performed repeatedly.

In application of ultrasonic wave or high-frequency wave for heating, an ultrasonic heater or a high-frequency generator may be used without the upper mold 3*a* and the lower mold 3*b*.

The invention is not limited to the above embodiments but various modifications and variations may be made to the embodiments without departing from the scope of the invention. Such modifications and variations, as well as their equivalents are also included in the scope of the invention.

INDUSTRIAL APPLICABILITY

The invention is mainly applicable to secondary forming, such as end-face processing and recess formation, of the three-dimensional netted structure.

The embodiments and their examples discussed above are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. The scope and spirit of the present invention are indicated by the appended claims, rather than by the foregoing description.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

REFERENCE CHARACTER LIST

1. Cushion
2. Three-dimensional netted structure
2*a*. End area
2*b*. Another area
3. Mold
4. Openings
5. Edge member
6. Steam nozzle
7. Rim
8. Chair
9. Attachment
3*a*. Upper Mold
3*b*. Lower Mold
10. Space
11. Upper Plate
12. Lower Plate
13. Support Column
16. Convex

What is claimed is:

1. A method of secondary forming a cushion having a spring-like structure made of continuous filaments tangled at random in loops and made to partly adhere to one another with heat after primary forming the cushion, the method comprising:

a thermal softening step of thermally softening a three-dimensional netted structure having a plurality of surfaces formed thereon by hot press, wherein the three-dimensional netted structure comprises a first part and a second part, the bulk density of the three-dimensional netted structure is 0.03 to 0.20 g/cm³, and the three-dimensional netted structure is placed between a heated upper mold and a heated lower mold;

a compression step of compressing the first part of the three-dimensional netted structure with the upper mold and the lower mold;

a curing step of forcibly or naturally cooling down the three-dimensional netted structure with a coolant to cure texture of the three-dimensional netted structure; and a mold release step of releasing the three-dimensional netted structure from the mold;

wherein:

in the thermal softening step and in the compression step, the second part of the three-dimensional netted structure is spaced from the upper mold and is not in contact with the upper mold; and in the compression step, when the three-dimensional netted structure is in a compression state, a space is formed between the upper surface of the second part of the three-dimensional netted structure and the upper mold while the first part of the three-dimensional netted structure is compressed by the upper mold and the lower mold.

2. The method of claim 1, wherein the upper mold has a frame structure, and the upper mold is used with compression elements to form the space.

3. The method of claim 2, wherein the three-dimensional netted structure comprises a middle compressed part and peripheral compressed parts.

4. The method of claim 2, wherein the thermal softening step comprises a pre-heating step and a main hot press step.

* * * * *